US012633844B2

(12) United States Patent
Weber et al.

(10) Patent No.: US 12,633,844 B2
(45) Date of Patent: May 19, 2026

(54) POWER CONVERTER WITH DYNAMIC CARRIER FREQUENCY VARIATION

(71) Applicant: Robert Bosch GmbH, Stuttgart (DE)

(72) Inventors: Christian Weber, Bonn (DE); Dennis Burger, Friolzheim (DE); Helge Sprenger, Kornwestheim (DE); Thomas Zeltwanger, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 18/568,396

(22) PCT Filed: Apr. 29, 2022

(86) PCT No.: PCT/EP2022/061443
§ 371 (c)(1),
(2) Date: Dec. 8, 2023

(87) PCT Pub. No.: WO2022/258256
PCT Pub. Date: Dec. 15, 2022

(65) Prior Publication Data
US 2024/0275308 A1 Aug. 15, 2024

(30) Foreign Application Priority Data
Jun. 11, 2021 (DE) .................... 10 2021 205 968.6

(51) Int. Cl.
*H02M 7/539* (2006.01)
*H02M 1/14* (2006.01)
(Continued)

(52) U.S. Cl.
CPC ........... *H02M 7/5395* (2013.01); *H02M 1/14* (2013.01); *H02M 1/44* (2013.01)

(58) Field of Classification Search
CPC ........ H02M 7/5395; H02M 1/14; H02M 1/44; H02M 1/15; H02P 6/10
See application file for complete search history.

(56) References Cited

U.S. PATENT DOCUMENTS 4,808,903 A * 2/1989 Matsui .................... H02P 21/22
318/808
7,567,048 B2 7/2009 Shin et al.
(Continued)

FOREIGN PATENT DOCUMENTS

DE 3912706 A1 10/1990
DE 19651281 A1 6/1998
(Continued)

OTHER PUBLICATIONS

Translation of International Search Report for Application No. PCT/EP2022/061443 dated Aug. 25, 2022 (3 pages).

*Primary Examiner* — Yusef A Ahmed
(74) *Attorney, Agent, or Firm* — Michael Best & Friedrich LLP

(57) ABSTRACT

The present invention relates to the control of an electrical power converter. The power converter is controlled with a predefined modulation frequency. This modulation frequency can be variably adjusted. In particular, the modulation frequency can be varied around a basic frequency in a predefined frequency range. The frequency range, in which the modulation frequency is varied, and also the pattern, with which this variation occurs, can be adjusted.

10 Claims, 2 Drawing Sheets

(51) Int. Cl.
    H02M 1/44           (2007.01)
    H02M 7/5395      (2006.01)

(56)               References Cited

U.S. PATENT DOCUMENTS

| | | | | |
|---|---|---|---|---|
| 7,782,005 | B2 * | 8/2010 | Shin | H02P 6/14 318/632 |
| 8,120,341 | B2 * | 2/2012 | Melanson | H02M 1/4225 323/282 |
| 8,193,743 | B2 * | 6/2012 | Yamada | H02M 7/53875 363/41 |
| 8,217,602 | B2 * | 7/2012 | Ikei | H02P 29/032 318/432 |
| 8,866,435 | B2 * | 10/2014 | Suhama | H02P 21/08 318/807 |
| 8,907,604 | B2 * | 12/2014 | Miller | H02M 7/5395 327/551 |
| 9,816,743 | B2 * | 11/2017 | Nakase | F04B 49/06 |
| 11,558,000 | B2 * | 1/2023 | Hara | H02P 23/28 |
| 11,876,470 | B2 * | 1/2024 | Wolf | B60L 15/08 |
| 12,057,794 | B2 * | 8/2024 | Sprenger | B60L 15/20 |
| 2006/0097685 | A1 * | 5/2006 | Shin | H03K 7/06 318/696 |
| 2007/0252625 | A1 * | 11/2007 | Shin | H02M 7/5395 327/113 |
| 2007/0279948 | A1 * | 12/2007 | Shin | H02P 21/00 363/41 |
| 2008/0089444 | A1 * | 4/2008 | Shin | H02M 1/12 375/326 |
| 2010/0052583 | A1 * | 3/2010 | Takamatsu | B60L 50/51 318/400.09 |
| 2010/0185350 | A1 * | 7/2010 | Okamura | H02M 1/327 701/22 |
| 2013/0026955 | A1 * | 1/2013 | Kikunaga | H02P 27/085 318/51 |
| 2013/0214599 | A1 * | 8/2013 | Taira | G06F 1/04 307/31 |
| 2018/0076744 | A1 * | 3/2018 | Wolf | H02P 6/10 |
| 2020/0028460 | A1 * | 1/2020 | Lee | H02P 21/22 |
| 2020/0028462 | A1 * | 1/2020 | Kim | H02P 27/085 |
| 2020/0204086 | A1 * | 6/2020 | Einsele | H02M 7/5395 |
| 2020/0274442 | A1 * | 8/2020 | Hanioka | H02M 7/53873 |
| 2020/0343814 | A1 * | 10/2020 | Hamada | H02M 3/156 |
| 2023/0327599 | A1 * | 10/2023 | Rosen | H02P 29/60 318/473 |

FOREIGN PATENT DOCUMENTS

| | | | |
|---|---|---|---|
| DE | 102007003737 | A1 | 8/2007 |
| DE | 102009049055 | A1 | 4/2011 |
| DE | 102017120981 | A1 | 3/2018 |
| DE | 102018204221 | A1 | 9/2019 |

* cited by examiner

MODULATION
FREQUNCEY
ADJUSTED — S1

SWITCHING SIGNALS
FOR AN ELECTRICL
POWER CONVERTER
ARE GENERATED — S2

POWER CONVERTER WITH DYNAMIC CARRIER FREQUENCY VARIATION

BACKGROUND OF THE INVENTION

The present invention relates to a control device for an electrical power converter as well as an electrical power converter with such a control device. The present invention further relates to a method for controlling an electrical power converter.

A so-called pulse width modulation (PWM) can be used to operate rotary field machines, such as those used in electric drive systems for electrically driven vehicles. Hereby pulse width modulated control signals can be fed to the switching elements of an electrical power converter in order to open or close these switching elements. The pulse width modulated control of the individual switching elements allows a predefined output voltage or predefined output current to be adjusted on the power converter.

Document DE 10 2018 204 221 A1 describes a method for controlling a pulse width modulated power converter. In particular, it is proposed to divide a PWM grid into two sub-intervals and to perform a separate calculation of a space vector for each sub-interval of the PWM grid, on which the control of the switching elements of the power converter is based.

SUMMARY OF THE INVENTION

The present invention creates a control device for an electrical power converter, an electrical power converter, and a method for controlling an electrical power converter with the features of the independent claims. Further advantageous embodiments are the subject matter of the dependent claims.

Accordingly, the following is provided:

A control device for an electrical power converter with a signal generating device and a control unit. The signal generating device is designed to receive an input parameter. Furthermore, the signal generating device is designed to generate switching signals using the received input parameter. The generated switching signals can be provided to switching elements of the inverter. The switching signals hereby have a predefined modulation frequency. The control unit is designed to adjust the predefined modulation frequency in the signal generating device. In particular, the control unit is designed to adjust a frequency as a modulation frequency that varies in a predefined frequency range and with a predefined pattern around a basic frequency. The frequency range and/or the pattern for varying the modulation frequency can be adjusted.

The following is furthermore provided:

An electrical power converter with a control device according to the present invention and multiple switching elements. The multiple switching elements are opened and closed using the switching signals generated by the control device.

Finally, the following is provided:

A method for controlling an electrical power converter. The method comprises a step of adjusting a modulation frequency. The adjusted modulation frequency has a frequency that varies around a predefined basic frequency in a predefined frequency range and with a predefined pattern. The method further comprises a step of generating switching signals for the power converter. The switching signals are in particular generated using the adjusted modulation frequency and a received input parameter.

The present invention is based on the knowledge that a frequency modulated control of the switching elements of an electrical power converter, in particular with a pulse width modulated control of the power converter, can result in different advantages and disadvantages depending on the selected modulation frequency. The present invention is further based on the knowledge that when the electrical power converter is controlled at a constant modulation frequency over a longer period of time, these effects, and in particular the resulting disadvantages, are increasingly noticeable.

It is therefore an idea of the present invention to take this knowledge into account and to provide a control for the switching elements of an electrical power converter, in which negative effects, such as electromagnetic interference, noise generation, voltage ripple in the electrical system, etc., can be mitigated. For this purpose, it is provided, on the one hand, that the basic frequency for the modulation of the control signals can be variably adjusted. Furthermore, it is further provided to vary the modulation frequency for controlling the switching elements in a power converter with a predefined frequency range around the predefined basic frequency. Thereby both the frequency range, in which the modulation frequency is varied around the predefined basic frequency, and the pattern or scheme, with which the variation is varied around the basic frequency, can be adjusted. In particular, for example, predefined framework conditions regarding the emission of electromagnetic interference signals, noise development or voltage ripple can be considered in the electrical system. In this way, for example, limit values or specifications regarding electromagnetic emission, noise behavior, voltage ripple, etc. can be complied with more easily. In particular, further components for minimizing the mentioned negative influences can be dimensioned smaller or even entirely eliminated, if necessary.

The modulation frequency is considered thereby to be the frequency whose period duration corresponds to a PWM interval, for example. In this case, a switching operation for opening the switching element and a switching operation for closing the switching element are usually carried out in each switching element of the voltage converter. If necessary, two consecutive switch-on or switch-off operations can be combined by selectively shifting the switch-on time intervals and/or switch-off time intervals.

In this case, the switching operations of the corresponding switching element result in a switching frequency, which is half as large as the modulation frequency. Otherwise, the switching frequency of the switching elements in the voltage converter corresponds to the modulation frequency.

By dynamically adjusting the modulation frequency and in particular the selective variation of the modulation frequency within a predefined frequency range and with specifically selected variation patterns, it is thus possible to adjust the settings depending on the operating state of the power converter in such a way that the required requirements and specifications can be met. Since different properties such as electromagnetic emissions, noise development, voltage ripple are particularly critical for different operating states, the adjustment of the modulation frequency and in particular the frequency range and the variation pattern for the respective operating state can be selected, such that the respective critical parameter is particularly minimized. In this way, additional components, for example the dimensioning of a DC link capacitor in the voltage converter, electromagnetic filters for reducing electromagnetic interference, etc., can be dimensioned smaller. In this way, both the design space can be reduced and the required costs for the production of the entire system can be reduced.

According to one embodiment, the control unit of the control device is designed to adjust the basic frequency within a predefined range for the basic frequency. In particular, the control unit can adjust the basic frequency for modulating the control signals depending on the operating state of the power converter and/or the entire system with the power converter, for example an electric drive system. For example, in an electric drive system, the basic frequency for modulation can be adjusted as a function of the rotational frequency of an electric machine and/or other operating parameters. For example, a variation of the modulation frequency for the electrical power converter in such a system is possible in a range between 2 kHz and 20 kHz. Depending on the application and components used, however, any other control ranges for selecting the basic frequency can also be selected.

According to one embodiment, the control unit is designed to adjust the predefined frequency range for varying the modulation frequency around the basic frequency as a function of the adjusted basic frequency. Additionally or alternatively, the control unit can adjust the predefined pattern for varying the modulation frequency as a function of the set basic frequency. Since different effects and interferences arise for the electrical power converter and the connected components depending on the selected basic frequency, in each case one or more of these effects can be selectively influenced by adjusting the frequency range in which the modulation frequency is varied and the pattern used for varying the modulation frequency. If, for example, a selected basic frequency is to be expected to have a particularly strong electromagnetic influence, the frequency range and the pattern for varying the modulation frequency can be selected, such that the electromagnetic influences in particular are minimized.

According to one embodiment, the predefined pattern with which the modulation frequency can be varied around the basic frequency comprises multiple predefined frequencies. The multiple frequencies can be within the predefined frequency range. In this case, it is possible to change between the multiple predefined frequencies randomly, pseudo-randomly or according to any other suitable specification. In particular, the change between the individual predefined frequencies can occur according to a predefined statistical distribution. For example, the change between the individual frequencies can be uniformly distributed. Further statistical distributions, such as a Gauss distribution or the like, are also possible. For example multiple frequencies can be selected within the predefined frequency range which are equidistantly distributed within the predefined frequency range. In this case, any number of multiple predefined frequencies can generally be selected within the frequency range. In a simple example, two frequencies, for example, the two frequencies at the edge of the frequency range around the basic frequency, can be selected. With three frequencies, for example, the two outer frequencies of the frequency range and the basic frequency itself can be selected. In addition, four or more frequencies within the predefined frequency range can of course also be selected, which are selected according to a predefined specification to determine and adjust the respective modulation frequency.

According to one embodiment, the control unit is designed to adjust the predefined frequency range as a function of electromagnetic interference caused by the power converter or components connected to the power converter. Additionally or alternatively, the predefined pattern with which the frequencies are varied within the predefined frequency range can also be adjusted as a function of the electromagnetic interferences caused or expected. If, for example, a particularly strong electromagnetic interference is to be expected at a set basic frequency of a certain operating mode of a system with the power converter, the occurrence or intensity and the frequency spectrum of electromagnetic interference can be counteracted by corresponding adjustment (e.g. widening) of the frequency range and/or the pattern for the change within the frequency range. In this way, the electromagnetic compatibility of the entire system can be increased. In particular, filter devices for suppressing electromagnetic interference can also be dimensioned smaller if the development of electromagnetic interference can already be reduced by adjusting the frequency range and/or the pattern for changing the modulation frequency.

According to one embodiment, the control unit is designed to adjust the predefined frequency range as a function of a noise developed by the power converter and/or a component controlled by the power converter. Additionally or alternatively, the pattern for changing the modulation frequency within the predefined frequency range can be adjusted depending on a predicted or measured noise level. By varying the modulation frequency, the control of the switching elements in the power converter does not occur continuously at a fixed frequency. Accordingly, a variation of the modulation frequency within a frequency range, in particular with an especially suitable pattern for this purpose, can counteract noise development perceived as disturbing by a user. Since the development of noise and also the subjective perception by a user can be different, in particular at different base frequencies, the frequency range and/or the pattern for varying the modulation frequency can be adjusted depending on the basic frequency, for example. Moreover, further parameters, such as an operating state of the power converter or the like, can also be adapted to adjust the frequency range or the pattern to vary the modulation frequency. For example, in an electric vehicle that comprises a corresponding power converter in the drive system, the noise level can be deliberately raised when driving slowly in order to increase the attention of passers-by in the vicinity of the electric vehicle.

According to one embodiment, the control unit is designed to adjust the predefined frequency range as a function of a voltage ripple in the DC link of the power converter. Additionally or alternatively, the pattern for varying the modulation frequency within the frequency range can also be adjusted as a function of the voltage ripple in the DC link of the power converter. In this way, the intensity of voltage ripples can be reduced by varying the modulation frequency within a suitable frequency range and with a suitable pattern, particularly in operating states that can cause increased voltage ripples. In this way, additional measures for protecting the DC link capacitor and other components can be omitted or at least dimensioned smaller. Since the voltage ripple can also have an influence on the noise level when operating the system, it is also possible to optimize the noise level by selectively adjusting the voltage ripple.

According to one embodiment, the control unit is designed to adjust the predefined frequency range as a function of an electrical current in the DC link of the power converter. Additionally or alternatively, the predefined pattern can also be adjusted for varying the modulation frequency in the predefined frequency range as a function of an electrical current in the DC link. For example, the electrical current can be detected metrologically or can also be calculated, if required. It is also possible to adjust the frequency range and/or the pattern for varying the modulation frequency as a function of predefined target values. In addition to adjusting the predefined frequency range or the pattern for varying the modulation frequency, these parameters can also be adjusted depending on other factors, such as a torque or speed to be adjusted in an electric drive system. Also in this case, sensor-detected values, predicted values or target values can be used as the basis for adjusting the frequency range and/or the pattern.

The above configurations and further developments can be arbitrarily combined with one another as far as is reasonable. Further configurations, further developments, and implementations of the invention also include combinations not explicitly mentioned of features of the invention described above or below with respect to the embodiment examples. The person skilled in the art will in particular also add individual aspects as improvements or additions to the respective basic forms of the invention.

BRIEF DESCRIPTION OF THE DRAWINGS

Further features and advantages of the invention are explained below with reference to the figures. Shown are.

DETAILED DESCRIPTION

Figure 1:
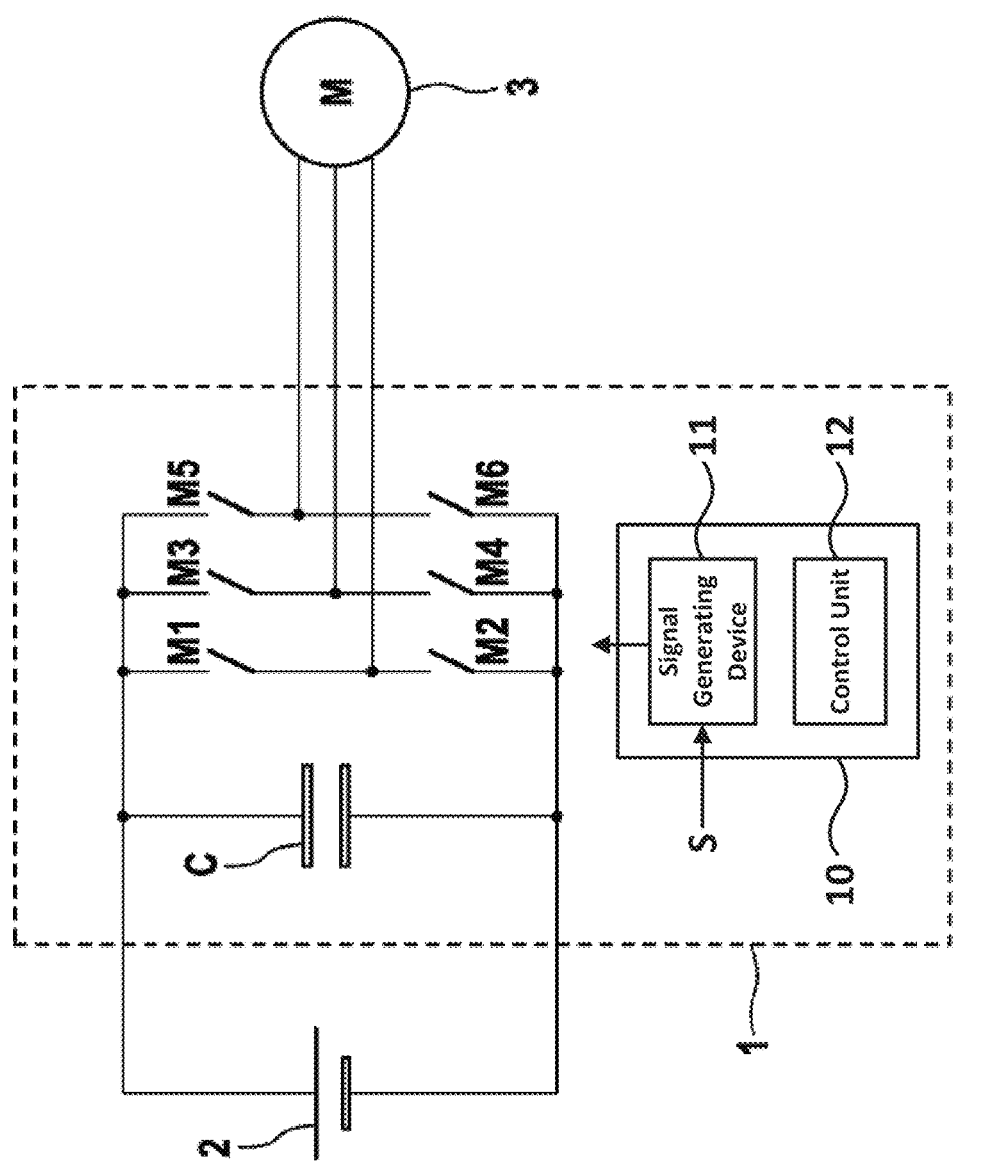
FIG. 1: a schematic representation of a block diagram of an electric drive system with a power converter, comprising a control unit according to one embodiment.

FIG. 1 shows a schematic representation of a block diagram of an electric drive system with an electrical power converter 1. For example, the power converter 1 can be an inverter that converts an input DC voltage into a single-phase or multi-phase AC electric voltage and provides it at the output. For example, a DC voltage source 2, such as a traction battery of an electric vehicle or the like, can be connected to the input of the power converter 1. For example, an electric motor 3 can be connected to the output of the power converter 1. The embodiment shown in the embodiment example presented here with a three-phase electric motor 3 serves only as an example for explaining the basic principle and does not constitute a limitation of the present invention. In addition, an electrical machine 3 with any number of electrical phases other than three can also be connected to a corresponding power converter 1. In principle, any other electrical power converter 1, for example a DC voltage converter or the like, is also possible in addition to an inverter.

In the DC link of the power converter 1, for example, a DC link capacitor C can be provided. Furthermore, the power converter 1 can comprise multiple switching elements M1 to M6. In the case of a three-phase inverter, for example, three half bridges with in each case two switching elements Mi can be combined to form a so-called B6 bridge. Since the basic principle of electrical power converters, in particular single or multi-phase inverters, is known, this is not explained in more detail here.

During operation of the power converter 1, the switching elements Mi of the power converter 1 can, for example, in each case be controlled with a predefined modulation frequency. For example, a pulse width modulated (PWM) modulation can be used to control the individual switching elements Mi. Hereby the period duration corresponds to the modulation frequency of a PWM period.

A control unit 10 is provided to control the individual switching elements Mi of the power converter 1. This control unit 10 can receive, for example, one or more target values S. Based on these target values S, the control unit 10 can generate a pulse width modulated control signal for each of the switching elements Mi and provide it to the respective switching element Mi.

For generating the control signals, the underlying modulation frequency can be varied. For this purpose, a basic frequency can first be specified or determined. For example, for electrical power converters in electric drive systems, the basic frequency can vary in the range between 2 kHz and 20 kHz. For example, the basic frequency can be adjusted as a function of the speed of the electric motor 3 connected to the power converter 1. For example, a first basic frequency can be specified at low rotational frequencies, and a further basic frequency different therefrom can be selected at higher rotational frequencies. In addition, any other specifications for selecting and adjusting the basic frequency for modulating the control signals for controlling the Mi switching elements are generally possible.

After a basic frequency for modulating the control signals has been received or determined, the control unit 10 can generate the control signals for the individual switching elements Mi using that basic frequency. In this case, however, the modulation frequency for generating the control signals can be varied around the basic frequency in a predefined frequency range. In this way, the modulation of the control signals for the switching elements Mi does not occur continuously at a constant, fixed modulation frequency, but is varied within the predefined frequency range around the basic frequency in accordance with a predefined specification.

For example, the control device 10 can comprise a control unit 12, which adjusts the modulation frequency for generating the control signals for controlling the switching elements Mi accordingly. For this purpose, a basic frequency can first be specified at the control unit 12. For example, the basic frequency can be provided by a superordinate device at the control unit 12. Alternatively, it is also possible for the control unit 12 to determine the basic frequency itself according to a predefined specification.

Based on the predefined basic frequency, the control unit 12 can then determine a modulation frequency and provide the modulation frequency at the signal generating device 11. The signal generating device 11 can then generate control signals for the individual switching elements Mi of the power converter 1 according to the modulation frequency of the control unit 12 and provide them to the switching elements Mi. For example, a target value or multiple target values can be specified at the signal generating device 11. Based on the target value and the modulation frequency, the signal generating device 11 can generate, for example, pulse width modulated control signals for the individual switching elements Mi and provide them to the switching elements Mi. The period duration of the grid for the pulse width modulated control corresponds thereby to the period duration of the modulation frequency provided by the control unit 12.

The control unit 12 can vary the modulation frequency within a frequency range based on the predefined basic frequency. Thus, a constant modulation frequency is not provided at the signal generating device 11, but the modulation frequency is varied by the control unit 12 within predefined limits. The frequency range within which the modulation frequency is varied around the predefined basic frequency, and the pattern with which the modulation frequency is varied around the basic frequency can thereby be adjusted. In particular, the frequency range and the pattern for varying the modulation frequency can be adjusted as a function of further parameters, such as the operating state of the drive system, in particular the power converter 1 or further components in connection with the power converter 1, sensor-detected values, predefined target values or calculated parameters. In particular, further framework conditions, such as specifications, limit values, etc. for the power converter 1 and components connected to the power converter 1 can be considered. In this way, for example, the frequency range and/or the pattern for varying the modulation frequency can be adjusted to minimize interference signals, such as electromagnetic interference, to influence the noise development within the power converter or components connected to the power converter, or also to limit voltage curves, for example, voltage ripples in the DC link of the power converter 1.

Figure 2:
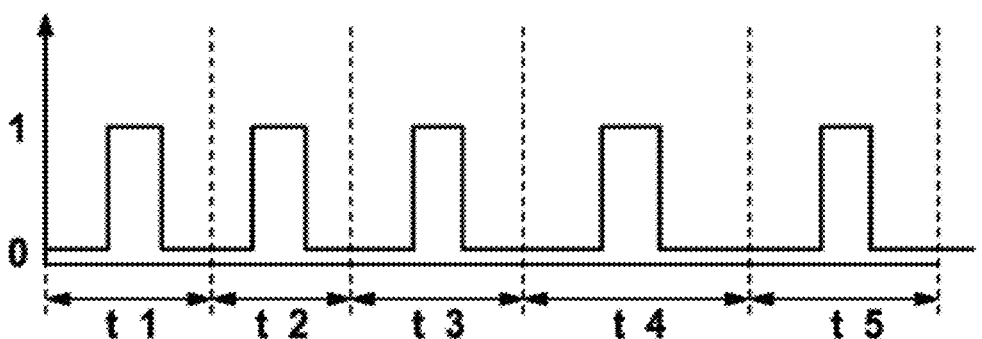
FIG. 2: a schematic diagram of a time plot illustrating the variation in modulation frequency according to one embodiment.

FIG. 2 shows a schematic representation of the curve of a control signal for controlling a switching element Mi of an electrical power converter 1. As can be seen in this case, the switching element Mi is switched on and off once within each time grid. However, the durations of the individual time grids $t\_i$ hereby are not all the same. Instead, the individual time grids or PWM grids can vary in their duration within predefined limits. The duration of a PWM grid corresponds thereby to the period duration of the underlying modulation frequency. Thus, the width $t\_i$ of a PWM grid varies with the variation of the underlying modulation frequency.

As previously stated, the frequency range within which the modulation frequency is varied and the pattern with which the modulation frequency is varied within the predefined frequency range can be changed. For example, the frequency range within which the modulation frequency is varied can be specified as a function of the underlying basic frequency. For example, the frequency range within which the modulation frequency is varied around the basic frequency can be characterized as a fraction of the underlying basic frequency. For example, the modulation frequency can be varied around the basic frequency in a range of 20% of the basic frequency. This relative frequency range, in which the modulation frequency can be varied around the basic frequency, can in particular be made dependent on further parameters. For example, depending on one or more further parameters, the frequency range can be varied between 0 and 20% of the basic frequency around the basic frequency. For example, the frequency range can also be adjusted as a function of the predefined basic frequency. Any function can be specified for this purpose, which provides the underlying basic frequency as the input value and the absolute or relative frequency range for the modulation frequency as the output value. Furthermore, it is also possible to specify, for example, the correspondence between predefined basic frequency and frequency range in the form of a previously saved table, for example a lookup table or the like.

Since, for example, the interference signals emitted by the power converter 1 and the components connected to the power converter 1, such as, for example, electromagnetic emissions, can fluctuate as a function of the modulation frequency and thus the basic frequency, the emitted interference signals and thus the electromagnetic interference can be influenced, for example, by dynamically adjusting the frequency range or the pattern for changing the modulation frequency within the frequency range, which is discussed in more detail below. In particular, the frequency range and/or the pattern for varying the modulation frequency can be adjusted for particularly critical basic or modulation frequencies, for example, in order to minimize the resulting interference signals. Hereby, for example, negative influences from other factors, such as noise levels or the like, can be deliberately accepted.

In addition to influencing the emission of interference signals as described, it is also possible, for example, to influence the noise emission by selectively adjusting the frequency range and/or the pattern for varying the modulation frequency.

For example, interference noise caused by the switching elements Mi of the voltage converter 1 or components connected to the voltage converter 1, such as an electric motor or the like, can be influenced by adjusting the variation in the modulation frequency. For example, at basic frequencies which lie in a frequency range that is particularly sensitive for humans, the noise development can be subjectively improved by widening the frequency range in which the modulation frequency is varied. A subjective perception of the resulting noise can also be influenced by changing the pattern with which the frequency is varied within the frequency range.

Furthermore, for example, the development of voltage ripple in the DC link or similar interference pulses within the power converter 1 can also be influenced by selectively adjusting the variation of the modulation frequency. For this purpose, for example, voltage ripple in the DC link of the power converter 1 can be sensor-detected or estimated based on a computing model. If critical voltage ripples are to be expected thereby, for example voltage ripples above a predefined threshold value, the level of the resulting voltage ripple can be minimized by adjusting the frequency range in which the modulation frequency is varied or by selecting a suitable pattern for varying the modulation frequency. For example, by changing the frequency range in which the modulation frequency is varied, the voltage ripples that occur can be reduced.

If necessary, further parameters, such as a current within the power converter 1, in particular, for example, a phase current from the output of the power converter 1 in the direction of an electric motor 3 or the like, can also be used as the basis for adjusting the frequency range and/or the pattern for varying the modulation frequency. For example, measured electrical currents, calculated electrical currents based on further parameters or target value specifications can be used as the basis for adjusting the frequency range and/or the pattern for varying the modulation frequency. In addition to an electrical current, any other parameters, such as a rotational frequency, a torque to be adjusted, or the like, on an electric motor 3 connected to the power converter 1 can of course also be used as the basis for adjusting the frequency range and/or pattern for varying the modulation frequency. Here to, measured values, calculated values or target values can be used as the basis for dynamic adjustment of the frequency range or pattern.

Any suitable model or scheme can generally be used to vary the modulation frequency within the predefined frequency range around the basic frequency. For example, the modulation frequency can be continuously increased from a lower value of the frequency range to an upper value of the frequency range continuously within a predefined time window or with a predefined step width. Analogously, a continuous reduction from an upper frequency value to a lower frequency value is also possible. It is also possible to alternately increase and decrease the modulation frequency within the predefined frequency range.

Moreover, it is also possible to define two or more fixed frequency values within the predefined frequency range and to select the predefined frequency values within the frequency range according to a predefined model or scheme. For example, two frequency values can be selected for a binary model, in particular the lower value of the frequency range and the upper value of the frequency range. These two values can then be selected randomly or pseudo-randomly for the modulation frequency. However, predefined sequences, in particular previously defined sequences stored in a memory for the selection of the respective frequency as a modulation frequency, are also possible.

The binary scheme for changing the modulation frequency described above can be performed particularly simply and with low computing power. In addition, however, patterns with more than two fixed predefined frequencies are also possible. For example, in addition to the lower and the upper cutoff frequency of the frequency range, the basic frequency, which is usually in the middle, can also be defined as a further frequency component for the selection of the modulation frequency. For example, multiple frequencies can also be selected within the predefined frequency range according to a predefined pattern. For example, multiple equidistant frequencies within the predefined frequency range can be selected. Even in such cases, one of the predefined frequencies can be selected randomly, pseudo-randomly or according to a previously saved sequence as the modulation frequency. Depending on the application, any suitable stochastic distribution can hereby be used as the basis for the selection of the modulation frequency from the multiple predefined frequencies. For example, the individual predefined frequencies within the predefined frequency range can be selected according to a uniform distribution, a Gauss distribution, or the like. In particular, complex sequences such as random or pseudo-random selection of the frequency components can result in at least approximately white noise. This can advantageously affect at least some of the aforementioned properties, such as noise emission or electromagnetic interference signals.

The aforementioned parameters, such as the adjustment of the predefined frequency range in which the modulation frequency can be varied around the basic frequency or the pattern with which the modulation frequency can be varied within the frequency range, can be adjusted as required depending on the objective, such as noise emission, reduction of electromagnetic interference signals, reduction of voltage ripple in the DC link, etc. In this case, a frequency range and/or pattern for varying the modulation frequency can in particular also be deliberately selected to reduce one of the parameters, which could be disadvantageous for the remaining parameters that cannot currently be critical. By dynamically adjusting the frequency range and/or pattern for varying the modulation frequency, one or more particularly critical parameters can thus be positively influenced. This means that the design of the system, and in particular the components for filtering or suppressing the negative or critical properties, can be dimensioned smaller.

Figure 3:
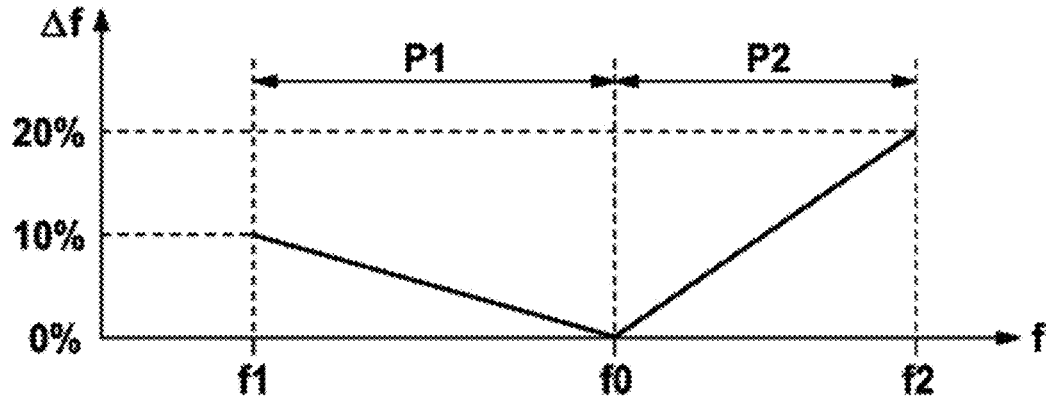
FIG. 3: a schematic diagram of a graph illustrating the variation in modulation frequency as a function of a basic frequency, according to one embodiment.

FIG. 3 shows a diagram of a possible configuration for adjusting the frequency range $\Delta f$ as a function of the basic frequency f as well as selecting a corresponding pattern for varying the modulation frequency. This example is intended to exemplarily illustrate one possibility only and does not represent a limitation of the present invention. Instead, any other selection of frequency ranges and patterns is also possible for varying the modulation frequency.

In the horizontal direction, the basic frequency f is applied. In the example shown here, the power converter 1 can be operated at a basic frequency between a lower frequency f1 and a higher frequency f2. For example, in one possible embodiment, a power converter can be operated in a range of the basic frequency of between 2 kHz and 20 kHz. The determination or adjustment of the basic frequency f for the power converter 1 can be carried out according to any specifications, for example as a function of a rotational frequency of a connected electric motor or the like.

As can be seen in FIG. 3, with a selected or set basic frequency f at the lower end f1 of the possible range of the basic frequency, the modulation frequency can be varied by approx. 10% around the set basic frequency f1. The magnitude of the frequency range $\Delta f$ within which the modulation frequency is varied around the basic frequency becomes continuously smaller down to a value f0 in the example presented here. In the range P1 between the frequency f1 and the frequency f0, a first pattern for varying the modulation frequency hereby is used. For example, a binary change between two predefined frequencies within the predefined frequency range $\Delta f$ can be used as a pattern for varying the modulation frequency around the fundamental frequency in this range marked P1. For example, a statistical uniform distribution can be used to randomly switch between two frequency values. In the range P2 between f0 and f2, on the other hand, a further or second pattern can be used for varying the modulation frequency. In the range marked P2, for example, more than two fixed predefined frequencies can be selected within the predefined frequency range $\Delta f$, which are selected, for example, using a statistical Gauss distribution within the predefined frequency range $\Delta f$. Of course, any other or further patterns than the aforementioned variation options are also possible for varying the modulation frequency around the basic frequency. As can further be seen in FIG. 3, the magnitude of the frequency range $\Delta f$ within which the modulation frequency is varied around the basic frequency f becomes larger with increasing basic frequency f. For example, with a set basic frequency f0 the magnitude of the frequency range $\Delta f$ can be adjusted to zero, i.e. there is no variation of the modulation frequency at all, but the basic frequency f0 is continuously used as the modulation frequency. If, on the other hand, the frequency f2 is set as the basic frequency, the modulation frequency can be varied within the frequency range $\Delta f$ in the range of ±20% around the basic frequency f2.

As already mentioned above, any other schemes and numbers for defining the frequency ranges and selecting the patterns for varying the modulation frequency are of course also possible. For example, the frequency range with which the modulation frequency is varied around the basic frequency can also remain constant across a range of the basic frequency. It is also possible to use the same pattern for varying the modulation frequency around the basic frequency across the entire range of the basic frequency.

In addition to the variation of the frequency range and the pattern for varying the modulation frequency across the basic frequency f described herein, both the frequency range and the pattern for varying the modulation frequency can also be selected and set as a function of any other parameters. In this way, individual properties of the power converter 1 or components connected to the power converter 1 can be selectively influenced.

Particularly preferably, a first pattern is used in the range P1 with the lower basic frequencies between the frequency f1 and the frequency f0 for varying the modulation frequency. This counteracts dominant interference noises, in particular in this range of the basic frequency. In this way, at basic frequencies which lie in a frequency range that is particularly sensitive for humans, the noise development is subjectively improved by widening the frequency range in which the modulation frequency is varied. A subjective perception of the resulting noise can also be influenced by changing the pattern with which the frequency is varied within the frequency range. Similarly, a second pattern P2 is particularly preferably used in the range P2 with the upper base frequencies between f0 and f2 for varying the modulation frequency. Thereby the dynamic adjustment of the frequency range and the pattern for varying the modulation frequency primarily serves for reducing the EMC emissions, which are dominant in this range. This means that the design of the system, and in particular the components for filtering or suppressing the negative or critical properties, can be dimensioned smaller.

Figure 4:
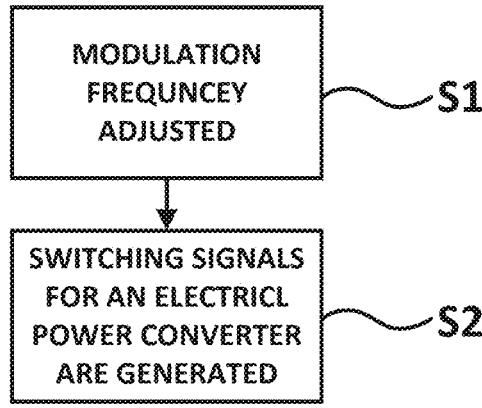
FIG. 4: a flowchart as it underlies a method for controlling a power converter, according to one embodiment.

FIG. 4 shows a schematic representation of a flowchart, as underlying a method for controlling an electrical power converter according to one embodiment. In step S1, a modulation frequency is adjusted. The adjusted modulation frequency can in particular have a frequency that is varied in a predefined frequency range. Furthermore, the modulation frequency can be varied with a predefined pattern around the predefined basic frequency.

In step S2, switching signals for an electrical power converter 1 are generated. The switching signals are generated using the adjusted modulation frequency. In addition, a received input parameter, for example a target value for a current, a torque or a speed of a connected electric motor, can be generated for generating the switching signals.

In summary, the present invention relates to the control of an electrical power converter. The power converter is controlled with a predefined modulation frequency. This modulation frequency can be variably adjusted. In particular, the modulation frequency can be varied around a basic frequency in a predefined frequency range. The frequency range, in which the modulation frequency is varied, and also the pattern, with which this variation occurs, can be adjusted.

The invention claimed is:

1. A control device for an electrical power converter, the control device comprising:
   a signal generating device configured to receive an input parameter, generate switching signals using the received input parameter, and provide the switching signals to switching elements of the electrical power converter, wherein the switching signals have a predefined modulation frequency; and
   a control unit configured to adjust the predefined modulation frequency in the signal generating device,
   wherein the control unit is further configured to
   adjust a frequency as the predefined modulation frequency that varies in a predefined frequency range and with a predefined pattern around a fundamental frequency,
   select the predefined modulation frequency from multiple equidistant frequencies within the predefined frequency range according to a random or pseudo-random sequence,
   generate a sequence of modulation frequencies that approximates white noise by random or pseudo-random selection within the predefined frequency range, and adjust the predefined frequency range and/or the predefined pattern based on an operating state of the electrical power converter, wherein
   the operating state of the electrical power converter includes a speed of a motor, a torque, and/or a rotational frequency of the motor.

2. The control device according to claim 1, wherein the control unit is configured to adjust the fundamental frequency within a predefined range.

3. The control device according to claim 2, wherein the control unit is configured to adjust the predefined frequency range and/or the predefined pattern for varying the predefined modulation frequency as a function of the adjusted fundamental frequency.

4. The control device according to claim 1, wherein the predefined pattern comprises a plurality of predefined frequencies within the predefined frequency range, and wherein the plurality of predefined frequencies are adjusted randomly, pseudo-randomly or according to a predefined specification, wherein
   the predefined specification comprises a statistical distribution selected from a uniform distribution or a Gaussian distribution.

5. The control device according to claim 1, wherein the control device is configured to adjust the predefined frequency range and/or the predefined pattern as a function of electromagnetic interference in the electrical power converter.

6. The control device according to claim 1, wherein the control device is configured to adjust the predefined frequency range and/or the predefined pattern as a function of a noise produced by the electrical power converter or a component controlled by the electrical power converter.

7. The control device according to claim 1, wherein the control unit is configured to adjust the predefined frequency range and/or the predefined pattern as a function of a voltage ripple of a DC link in the electrical power converter, wherein the voltage ripple is estimated using a computing model.

8. The control device according to claim 1, wherein the control device is configured to adjust the predefined frequency range and/or the predefined pattern as a function of an electrical current in a DC link of the electrical power converter, wherein the electrical current is a measured value, a calculated value, and/or a predefined target value.

9. An electrical power converter, comprising:
   a control device that includes
      a signal generating device configured to receive an input parameter, generate switching signals using the received input parameter, and provide the switching signals to switching elements of the electrical power converter, wherein the switching signals have a predefined modulation frequency; and
      a control unit configured to adjust the predefined modulation frequency in the signal generating device,
   wherein the control unit is further configured to
   adjust a frequency as the predefined modulation frequency that varies in a predefined frequency range and with a predefined pattern around a fundamental frequency;
   wherein the switching elements are opened or closed using the switching signals generated by the signal generating device,
   select the predefined modulation frequency from multiple equidistant frequencies within the predefined frequency range according to a random or pseudo-random sequence, generate a sequence of modulation frequencies that approximates white noise by random or pseudo-random selection within the predefined frequency range, and adjust the predefined frequency range and/or the predefined pattern based on an operating state of the electrical power converter, wherein the operating state of the electrical power converter includes a speed of a motor, a torque, and/or a rotational frequency of the motor.

10. A method for controlling an electrical power converter, the method comprising:

adjusting, via a control unit, a modulation frequency, wherein a set modulation frequency has a frequency varying at a predefined frequency range and with a predefined pattern around a predefined fundamental frequency; and generating, via a signal generating device, switching signals for the electrical power converter using the set modulation frequency and a received input parameter, selecting the modulation frequency from multiple equidistant frequencies within the predefined frequency range according to a random or pseudo-random sequence, generating a sequence of modulation frequencies that approximates white noise by random or pseudo-random selection within the predefined frequency range, and adjusting the predefined frequency range and/or the predefined pattern based on an operating state of the electrical power converter, wherein the operating state of the electrical power converter includes a speed of a motor, a torque, and/or a rotational frequency of the motor.

*     *     *     *     *